Patented Dec. 8, 1942

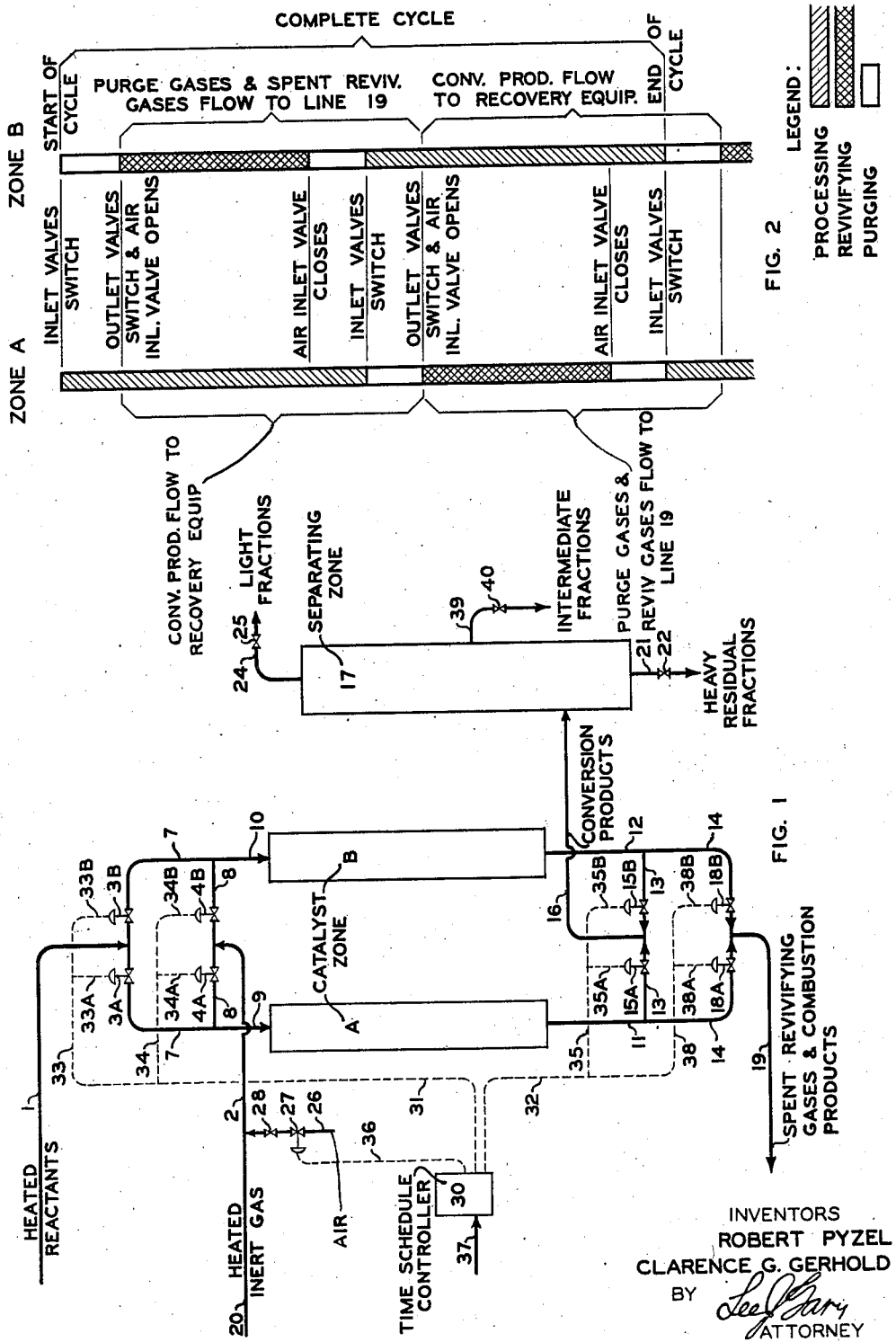

2,304,653

UNITED STATES PATENT OFFICE 2,304,653

OPERATION OF CATALYTIC PROCESSES

Robert Pyzel and Clarence G. Gerhold, Chicago, Ill., assignors to Universal Oil Products Company, Chicago, Ill., a corporation of Delaware Application February 27, 1939, Serial No. 258,608

5 Claims. (Cl. 252—237)

This is a continuation-in-part of our co-pending application Serial No. 245,840, filed December 15, 1938.

The invention relates specifically to an improvement in the method of operating processes of the type in which the reactants are continuously passed through a bed of catalyst or contact mass upon which heavy combustible materials such as coke or residual hydrocarbons are deposited during the conversion reaction which takes place in the presence of the catalyst or contact mass. In such processes, the deposited materials decrease the activity of the materials composing said bed and it is necessary, for continuous operation, to periodically divert the supply of reactants to another similar bed disposed in a separate zone of the system where the desired reaction is continued, while the activity of the first mentioned bed is restored by burning the deposited materials therefrom, following which it may again be employed to catalyze or otherwise assist in conducting the desired conversion of said stream of reactants, while the components of the second mentioned bed are revivified in the same manner.

To accomplish revivification of the bed of catalyst or contact mass, a stream of oxygen or oxygen-containing gases is passed through the bed at a temperature sufficient to cause combustion of the deposited materials and the effluent gases which comprise the spent revivifying gas stream and products of said combustion are discharged from the reactor containing the bed of material undergoing revivification.

Simultaneous with the revivification step taking place in one reactor, the conversion products resulting from passage of the reactants through the bed of fresh or revivified catalyst or contact material, are directed to suitable recovery equipment.

Ordinarily, a considerable mass of catalyst or contact material is disposed in the reactors which, at the end of the processing step, will retain a considerable volume of desirable conversion products and, at the end of the revivification step, will contain a considerable volume of combustion products and revivifying gases. To prevent commingling of the reactants and conversion products with the revivifying gases and combustion products when the flow of reactants is diverted from one reactor to the other, it is necessary to purge each reactor of the retained conversion products or revivifying gases and combustion products preceding each switch-over. This may be accomplished by passing a stream of relatively inert gases through the reactor to be purged for a sufficient time to allow the inert gases to sweep the revivifying gases and combustion products or conversion products, as the case may be, from the reactor wherein they are retained at the end of the revivifying and processing steps.

Following the purging period in the reactor, wherein revivification has been taking place, the stream of reactants is supplied to this zone for continued treatment in the presence of the revivified catalyst or contact mass and, following the purging period in the reactor wherein processing has been taking place, the stream of revivifying gases is supplied to this zone to accomplish revivification of the catalyst or contact mass.

To accomplish the uninterrupted flow of reactants to a zone containing a bed of active catalyst or contact material, the introduction of oxygen-containing gases to the zone in which revivification is taking place is discontinued a short time before processing of the reactants is completed in the other reaction zone, this time being sufficient to purge the reactor in which revivification has taken place so that this zone will be free of oxygen-containing gases when the stream of reactants is diverted thereto. Simultaneous with the diversion of said stream of reactants to the reactor containing the freshly revivified material, inert gases are supplied to the reactor containing the catalyst or contact mass to be revivified, for a sufficient length of time to purge this reactor of the conversion products retained therein, following which the oxygen-containing revivifying gases are supplied to this zone.

In accordance with the improved operation herein provided, the flow of the streams of materials issuing from each of the reactors continue to flow through their former course until the purging period in each reactor is completed instead of diverting their path of flow at the beginning of the purging period. As applied to the purging period in the reactor wherein conversion has been taking place, this delayed switching of the flow of effluent materials prevents the loss of valuable conversion products since the latter continue to flow from this reactor to the product separation and recovery equipment until the conversion products retained in this reactor are replaced by inert gases. As applied to the purging period in the reactor wherein revivification has been taking place, this method of operation prevents contamination of the conversion products with inert gases, spent revivifying gases and combustion products, since the latter continue to flow from the system or to suitable heat recovery equipment and storage until they have been replaced by products resulting from the conversion of the reactants supplied to this zone.

This improved method of operation is particularly advantageous in processes such as catalytic cracking, dehydrogenation and the like which involve frequent alternation of the reactors and short conversion and revivifying periods in each reactor. With frequent and short cycles, the loss of valuable conversion products, which would result from switching the flow of effluent materials from the reaction zones simultaneous with switching of the flow of inlet materials to the reaction zones, is obviously much greater than the loss which occurs with this same method of operation in other processes such as catalytic polymerization, for example, wherein the activity of the catalyst or contact mass decreases more gradually and much more prolonged conversion periods are employed in each reactor with less frequent alternation of the reactors with respect to their use as conversion and revivifying zones.

The provisions of the invention and the manner and means whereby the improved operation provided may be accomplished will be more apparent with reference to the accompanying drawing and the following description thereof. Fig. 1 of the drawing is essentially a flow diagram illustrating the flow of reactants, inert gases and revivifying gases with respect to those zones of the system with which the invention is particularly concerned, in a process of the character to which the features of the invention are applicable. Figure 2 is a graphic representation of the operating cycle of the process and illustrates the sequence of the several steps comprising a complete operating cycle and the time relationship between the steps simultaneously conducted in two catalyst reaction zones.

The invention herein claimed resides in the sequence of the several steps of the process and in the interrelated timing with respect to the changes in the flow through the system, and is not concerned with the specific form of apparatus employed nor the specific type of conversion reaction being conducted, so long as it is one in which a bed of catalyst or contact material provided for catalyzing or otherwise assisting the reaction requires periodic revivification.

Referring to the drawing, two similar catalyst zones A and B are indicated, each of which contains a mass of catalytic material, not illustrated, and in each of which the catalyst is employed for a predetermined time to accelerate the desired conversion of the reactants supplied thereto, following which the catalyst is revivified. The first step, which for the sake of convenience, will be termed "processing" and the second step, which for the sake of convenience will be termed "revivification" are each accomplished, in the case here illustrated, in approximately the same length of time in order that, with two catalyst zones or multiples of two, processing of the reactants may be continuous, the catalyst in one zone or one set of zones being revivified, while the revivified catalyst in the other zone or other set of zones is employed for processing the reactants. Each processing and revivification period is preceded by a purging period during which the reactants and conversion products left in the reactor wherein processing has been taking place and the oxygen-containing gases and combustion products left in the reactor wherein revivification has been taking place are swept from the reactor by relatively inert gases.

In the particular case here illustrated, the flow of reactants, inert gases and revivifying gases is downward through the catalyst zones A and B and the latter are manifolded at the top by means of headers 7 and 8, each connected at their opposite ends with lines 9 and 10 leading to the respective zones A and B. Header 7 contains flow control valves 3A and 3B through which the stream of heated reactants supplied to header 7 through line 1 is directed, as desired, either to catalyst zone A or to catalyst zone B and header 8 contains flow control valves 4A and 4B through which a stream of heated inert gases or a mixture of such gases with minor amounts of air is supplied from line 2 to either catalyst zone A or catalyst zone B. The catalyst zones A and B are manifolded at the bottom by means of headers 13 and 14, each of which communicate at their opposite ends with lines 11 and 12 leading from the respective zones A and B. Header 13 contains flow control valves 15A and 15B through which the conversion products are delivered from the respective reactors A and B to line 16 and thence to separating zone 17. Header 14 contains flow control valves 18A and 18B through which the inert gases or gases resulting from revivification of the catalyst within the respective zones A and B are supplied to line 19 and either removed from the system or supplied from line 19 to suitable heat recovery equipment, not illustrated, and/or to suitable recirculating equipment, not shown, whereby they may be passed through a heating step, not illustrated, and thence through lines 20, 2, header 8 and lines 9 and 10 alternately to catalyst zones A and B for further use. Since this circulating equipment is not an essential or novel part of the present invention, it is not illustrated and we may, for the sake of convenience, consider that gases from line 19 are discharged from the system.

The conversion products supplied through line 16 to separating zone 17 are therein separated, in the particular case here illustrated, into heavy residual fractions which are removed from the separating zone through line 21 and valve 22 to cooling and storage or elsewhere, as desired, intermediate fractions such as reflux condensate formed by fractionation of the vaporous conversion products and boiling intermediate the residual fractions and the desired lower boiling products, the intermediate fractions being removed from zone 17 through line 39 and valve 40 and supplied therefrom to cooling and storage or, when desired, recycled through a suitable heating and vaporizing step, not illustrated, to line 1 wherefrom they pass with the heated fresh charging stock alternately to catalyst zones A and B for further treatment. The light fractions, comprising the desired low-boiling product of the process, are removed from separating zone 17 through line 24 and valve 25 to suitable condensation, cooling and recovery equipment of any desired form, not illustrated.

A regulated quantity of air is supplied to line 2 through line 26 and valve 27 which latter serves to periodically stop the flow through line 26 so that only relatively inert gases are supplied to the catalyst zones during the purging periods.

To better explain the particular flow of the various streams through the system during various periods of the operating cycle, let us assume that the process is first started with fresh catalyst in both zones A and B and that zone A is the first used for processing the reactants. The stream of reactants heated to the temperature required to initiate conversion is supplied through line 1 to header 7 and thence through valve 3A, which is opened during this step of the cycle, and through line 9 to zone A wherein they intimately contact the catalyst material disposed in this zone and wherefrom the resulting conversion products are discharged through line 11 and through valve 15A in header 13 to line 16 and thence to separating zone 17. During this initial step in the operation, since the catalyst in zone B is fresh and active, it does not require revivification and, accordingly, no revivifying gases are supplied thereto. However, to heat and precondition the catalyst bed in zone B for processing, a stream of relatively inert gases such as, for example, combustion gases substantially devoid of air are supplied at the desired temperature through line 20 and line 2 to header 8 and through valve 4B and line 10 to zone B wherein they come in intimate contact with the catalytic material disposed therein and heat the same to the temperature required for the subsequent processing step of the cycle. The resulting partially cooled inert gases are discharged from zone B through line 12 to header 14 and through valve 18B to line 19. During this period valves 3B, 4A, 15B and 18A are closed and the supply of air to line 2 through line 26 is prevented by closing block valve 28 in this line.

After a predetermined period of operation which will vary, depending upon the type of reaction being conducted, the particular nature of the catalyst employed and the temperature and pressure conditions employed in the catalyst zone, the activity of the catalyst with which the heated reactants are contacted will decrease, due to the deposition of carbonaceous material thereon, to such an extent that it is economically expedient to employ the fresh catalyst in the other catalyst zone. When this point in the operation is reached, valves 3A and 4B are closed, while valves 4A and 3B are opened so that the heated reactants are now supplied from line 1 through valve 3B and line 10 to zone B containing the fresh catalyst, while the heated inert gases are directed from line 2 through valve 4A and line 9 to zone A. When this switch-over is made, catalyst zone A will contain heated reactants and conversion products, while catalyst zone B will contain heated inert gases and, in accordance with the improved method of operation herein provided, valves 15A and 18B are left open, while valves 15B and 18A remain closed for a sufficient time following the switching of the control valves 3A, 3B, 4A and 4B to allow inert gases to replace the heated reactants and conversion products in zone A and to allow heated reactants and conversion products to replace inert gases in zone B so that the conversion products expelled from zone A pass through valve 15A and line 16 to separating zone 17, while the inert gases expelled from zone B pass through valve 18B to line 19 until inert gases appear at the outlet of zone A and conversion products appear at the outlet of zone B.

Immediately following the last described relatively short period of the operating cycle, valve 15B and 18A are opened, while valves 15A and 18B are closed so that the inert gases now leaving zone A are directed through valve 18A to line 19, while the conversion products now leaving zone B are directed through valve 15B to line 16 and separating zone 17.

At the same time that valves 15A, 15B, 18A and 18B are switched, valves 27 and 28 in line 26 are opened and air is introduced in regulated quantities through line 26 into line 2 wherein it commingles with the heated relatively inert gases from line 20 to form the oxygen-containing revivifying gases, the stream from line 2 continuing to flow through valve 4A and line 9 to zone A, while the stream of heated reactants continues to flow from line 1 through valve 3B and line 10 to zone B.

Following the initial opening of valves 27 and 28 in line 26, valve 28 remains open and the opening and closing of valve 27 determines whether the gases flowing through line 2 contain or are substantially devoid of oxygen.

Continuing with the operation above described: After catalyst zone A has been substantially purged of reactants and conversion products with inert gases and valves 27 and 28 in line 26 are opened to admit air to line 2, revivification of the catalyst continues in this zone and processing of the reactants continues in zone B until a short time before it is desired to divert the stream of reactants back to zone A. When this point in the operating cycle is reached, valve 27 in line 26 is closed, while the reactants continue to flow through valve 3B to zone B and the inert gases from line 20 continue to flow through line 2 and 4A to zone A, whereby the latter is substantially purged of oxygen-containing gases. Immediately following this purging period in zone A, valve 3A and 4B are opened, while valves 3B and 4A are closed to divert the stream of reactants from zone B to zone A and divert the stream of inert gases from zone A to zone B, valve 27 remaining closed for a time sufficient to substantially purge reactor B of conversion products. Then, immediately following this purging period in reactor B, valves 15A and 18B are opened, while valves 15B and 18A are closed and, simultaneously, valve 27 is opened to admit oxygen to line 2 and oxygen-containing revivifying gases to catalyst zone B. From this point on the operating cycle is repeated, the stream of reactants being shifted from the reaction zone containing the spent catalyst to be revivified to the reaction zone containing the freshly revivified catalyst and the stream of revivifying gases being shifted from the reaction zone containing the freshly revivified catalyst to the reaction zone containing the spent catalyst to be revivified, each shift in the stream of revivifying gases being preceded by a short period and succeeded by another short period during which the supply of oxygen to line 2 is discontinued. During the short period succeeding this switch, the reaction zone containing the freshly revivified catalyst is purged with inert gases and during the short period succeeding this shift, the reaction zone containing the spent catalyst to be revivified is purged with inert gases. At the end of the short period succeeding the aforementioned shift of the stream of gases from lines 1 and 2, the opened and closed position of the control valves in the manifolds at the outlet end of the catalyst reaction zones is shifted.

Although the invention contemplates manual opening and closing of control valves 3A, 3B, 4A, 4B, 15A, 15B, 18A and 18B, as well as valve 27, when desired, the particular arrangement illustrated in the accompanying flow diagram permits a relatively simple system of automatic control for all of these valves, in accordance with a predetermined time schedule, through a single control instrument indicated at 30 in the drawing. To accomplish this with a single control instrument, two of the four flow control valves 3A, 3B, 4A and 4B and two of the four control valves 15A, 15B, 18A and 18B are reverse-acting, while the other four are direct-acting so that a single impulse from the controller transmitted therefrom through line 31 and branch lines 33, 34, 33A, 33B, 34A and 34B to the actuating mechanisms of the respective valves 3A, 3B, 4A and 4B will serve to open valve 3A and 4B, for example, and close valves 3B and 4A. During the continuation of this impulse and upon determination of the impulse, valves 3A and 4B will be closed and valves 3B and 4A opened to remain in this position until the impulse is repeated. Likewise, a single impulse transmitted from controller 30 through line 32 and branch lines 35, 38, 35A, 35B, 38A and 38B with the actuating mechanism of the respective valves 15A, 15B, 18A and 18B serves to open valve 15A and 18B, for example, and close valves 15B and 18A, maintaining them in this position as long as the impulse is continued, valves 15B and 18A opening and valves 15A and 18B closing when the impulse is discontinued and remaining in this position until the impulse is repeated. Valve 27 may be either direct-acting or reverse-acting, as desired, and its opened or closed position is determined by the transmission or lack of transmission of an impulse thereto from controller 30 through line 36. The various valves operated through controller 30 may be fluid-actuated piston or diaphragm type of valves of any well known form or they may be electrically operated by a solenoid or motor receiving its electrical impulse through controller 30 in accordance with the time schedule for which this controller is set.

Although this invention is not concerned with the details nor the specific form of time schedule controller employed, since such controllers may be purchased to suit requirements from instrument manufacturers, it is worthy of note that one form of instrument which has been found particularly accurate and dependable in the operation of the process herein provided comprises a constant speed motor or clock geared to rotate a shaft one complete revolution during a period of time corresponding to one complete operating cycle of the process, this shaft being provided with cams which operate valves in lines 31, 32 and 36 to admit air supplied to the controller through line 37 to each of the lines 31, 32 and 36 at predetermined periods during the operating cycle and for a definite length of time. In the operation of this controller when, for example, valves 3B, 4A, 15B and 18A are direct-acting (i. e., closed by the transmission of air pressure thereto from controller 3 and valves 27, 3A, 4B, 15A and 18B are reverse-acting (i. e., opened by the transmission of air pressure thereto from the controller), the contour and relative position of the cams which operate the air valves to admit air to and release air from lines 31, 32 and 36 is such that the operating cycle shown in Figure 2 is obtained in zones A and B, as will now be described.

Starting at the point indicated in the graph, with valve 27 closed, air under pressure is first admitted to line 31 to open valves 3A and 4B and close valves 3B and 4A. At the point corresponding to the end of the first purge period, as shown in the graph, in zone B, air under pressure is admitted by the controller to lines 32 and 36 whereby to open valves 27, 15A and 14B and close valves 15B and 18A, air pressure still being maintained in line 31 so that valves 3A and 4B remain closed and valves 4B and 3A remain open. The position of the valves is maintained until that point is reached in the operating cycle at which revivification is completed in zone B. At this point air pressure is released from line 36, whereby valve 27 is closed. Then at the end of the second purge period shown on the graph in zone B, air pressure is released from line 31, whereby valves 3A and 4B are closed and valves 3B and 4A are opened, valve 27 remaining closed until the purge period in zone A is completed. At the end of the first purge period in zone A, as indicated on the graph, air pressure is again supplied to line 36 to open valve 27 and air pressure is released from line 32, whereby valves 15B and 18A are opened and valves 15A and 18B closed, the position of valves 3A, 3B, 4A and 4B remaining unchanged. The valves then all remain in the last named position until that point in the operating cycle at which revivification is completed in zone A at which point air pressure is released from line 36 to close valve 27 and purge zone A of oxygen-containing gases. Then at the end of the second purge period in zone A, the operating cycle, above described and indicated on the graph, is repeated.

It will be apparent, as indicated in Figure 2, that the time elapsed between a shift in the open and closed position of valves 3A, 3B, 4A and 4B and the second succeeding shift in the position of these valves comprises a complete operating cycle. It will also be apparent, as clearly illustrated in Figure 2, that the duration of the revivification period in each reaction zone is shorter by the length of time required for two purge periods than the duration of the processing step and that the reaction zone wherein revivification has been completed is in each instance purged of oxygen-containing gases before the open and closed position of inlet valves 3A and 3B, 4A and 4B is shifted and that the purge period in the reactor wherein processing has been completed succeeds the shift in the position of the inlet valves but precedes shifting of the open and closed position of outlet valves 15A, 15B, 18A and 18B. Thus, the flow of reactants to a zone containing active catalyst and purged of oxygen-containing gases is continuous and uninterrupted, while the flow of oxygen-containing revivifying gases is interrupted by the length of time required for a purge period in each reaction zone, one of these purge periods preceding switching of the inlet valves and the other purge period succeeding this switching. Since the flow of effluent gases from the reaction zones is determined by the open and closed position of outlet valves 15A and 15B, 18A and 18B, it will be apparent, as indicated in Figure 2, that, following the first switching of these valves, the conversion products from zone A continue to flow to the recovery equipment until the purge period in this zone is completed and inert gases have replaced the conversion products in this zone and that, during this same period of the operating cycle, the purging gases and spent revivifying gases discharged from zone B continue to flow through line 19 until the purging gases in this zone are replaced by reactants and conversion products. Thus, contamination of the conversion products with purging gases and spent revivifying gases and the loss of valuable conversion products is prevented.

In Figure 2, the sequence of steps shown and the time relationship between the steps which occur in the two reaction zones are essential features of the invention, but the invention is not limited to any specific duration of time for the complete operating cycle nor for any of the individual steps involved nor to any specific relationship between the time required for purging and the time required for revivification or processing, except that the revivification period is shorter than the processing period by the length of time required for two purge periods. However, to more concretely illustrate one specific operation embodying the features of the invention, a stream of heated vaporous products is subjected to catalytic cracking in the presence of a catalyst which, under the particular operating conditions employed, requires revivification after one hour of continuous operation. In this particular instance, the volume of each catalyst reaction zone in relation to the quantity of vaporous hydrocarbon reactants supplied thereto in a given time is such that approximately 40 seconds are required to substantially purge the reaction zone of inert gases with said reactants. The rate of flow of the purge gases employed is so regulated that they will also fill and substantially purge the reaction zone in approximately 40 seconds so that each purge period requires the same time. Under these conditions the temperature of the revivifying gases and the oxygen present in the gases is controlled to accomplish revivification of the catalyst in approximately 58 minutes and 40 seconds, the time between the successive switchings of the inlet valves and the time between the successive switching of the outlet valves being one hour in each case, the total delay between the switching of the inlet and the switching of the outlet valves being 80 seconds and the time required for one complete operating cycle being 2 hours.

We claim as our invention:

1. In a process of the character described, the improved method of operation which comprises supplying a stream of reactants to a reaction zone containing a revivified contact mass and also containing a relatively inert gas, simultaneously supplying a stream of relatively inert gas to another reaction zone containing a contact mass which requires revivification and also containing conversion products, continuing the introduction of said relatively inert gas to the second mentioned zone until it is substantially purged of conversion products and during this period supplying the effluent conversion products to recovery equipment, continuing the introduction of said reactants to the first mentioned zone until it is substantially purged of inert gas and during this period diverting effluent gases from said recovery equipment, at the end of the aforementioned purging periods continuing the introduction of said reactants to the first mentioned zone, supplying revivifying gases to the second mentioned zone, supplying the effluent stream from the first mentioned zone to said recovery equipment and diverting the effluent stream from the second mentioned zone from said recovery equipment, continuing the introduction of revivifying gases to the second mentioned zone for a time requisite to effect satisfactory revivification of the contact mass therein and then supplying a stream of relatively inert gas to this zone for a time required to substantially purge the same of revivifying gas, while continuing the introduction of reactants to the first mentioned zone and continuing the flow of effluents from said zones as last described, then supplying inert gas to the first mentioned zone and reactants to the second mentioned zone for a sufficient time to substantially purge the former of conversion products and substantially purge the latter of inert gas while continuing the flow of effluents from said zones in the manner last described, then supplying effluent gas from the second mentioned zone to said recovery equipment and diverting effluent gas from the first mentioned zone from the recovery equipment, while supplying revivifying gas to the first mentioned zone for the time required to accomplish satisfactory revivification of the contact mass therein, then supplying inert gas to the first mentioned zone for a time sufficient to substantially purge the same of revivifying gas while continuing to supply said reactants to the second mentioned zone and continuing the flow of effluents from said zones in the manner last described, then diverting the flow of said stream of reactants back to the first mentioned zone, diverting the stream of inert gas back to the second mentioned zone, and repeating the operation in the manner above described.

2. In a process of the character in which a continuous flowing stream of reactants is passed alternately through beds of contact material disposed in separate reaction zones, upon which contact beds carbonaceous material resulting from conversion of said reactants is deposited, said process involving revivification of the contact mass following the processing step in each reaction zone, and the revivifying and processing steps each being preceded by a purging period, the improvement which comprises supplying to recovery equipment products issuing from said reaction zones during each processing step and also those displaced from the reaction zones during the purging period preceding each revivification step, and diverting from said recovery equipment substantially all of the other materials discharged from the reaction zones including the relatively inert purging material displaced from the reaction zones during the purge period which precedes each processing step and also the displacement from said zones resulting from the initial introduction of reactants thereto following the last mentioned purge period.

3. In a process involving use of vapor recovery equipment and separate reaction zones to which a stream of reactants is alternately supplied for conversion therein, each of the reaction zones containing a mass of contact material which requires periodic revivification, said revivification being accomplished succeeding the processing step in each reaction zone by supplying a stream of revivifying gases thereto and each revivification and processed period being succeeded by a purging period with inert gas to displace revivifying gas and conversion products respectively, the reaction zone to which the reactants and revivifying material are supplied being periodically alternated, the improvement which comprises establishing communication between each reaction zone and said recovery equipment after the introduction of reactants to that zone has begun, maintaining the communication throughout the remainder of the processing step and the next succeeding purging period, and disconnecting each reaction zone from the recovery equipment after the purging period which follows the processing step therein and maintaining it so disconnected throughout the succeeding revivifying and purging steps and also during the period of displacement of inert gas with reactant to the reaction zone.

4. In a process wherein a stream of reactant is alternately passed through beds of contact material which becomes contaminated with objectionable deposits and are alternately revivified, the beds purged with inert gas prior to each processing step and each revivifying step to free said beds of conversion products and revivifying gas respectively, and products of the processing step discharged to recovery equipment, the improvement which comprises diverting from said recovery equipment displaced inert gas resulting from the initial introduction of reactant to said beds, after this initial displacement supplying the products of the processing step to the recovering equipment and also supplying to the latter effluent conversion products of the purging period which precedes each revivifying step, while diverting from the recovering equipment effluent revivifying gas from said beds during the revivifying steps and effluent inert gas resulting from the purging period which precedes each processing step.

5. In a catalytic conversion system comprising vapor recovery equipment and a reaction zone containing contact material through which streams of reactant and revivifying gas are alternately passed, and said zone purged with inert gas prior to each processing step and each revivifying step to free said zone of conversion products and revivifying gas respectively, the method of operation which comprises establishing communication between the reaction zone and said recovery equipment after introduction of the stream of reactant to the zone has begun, the reaction zone being disconnected from the recovery equipment during the initial introduction of reactant thereto, maintaining said communication throughout the remainder of the processing step and the purging period which precedes the revivifying step, then disconnecting the reaction zone from the recovery equipment and maintaining it so disconnected during the succeeding revivifying and purging steps and during the period of displacement of inert gas with reactant to the reaction zone, and then re-establishing communication with the recovery equipment for the renewed processing step in the reaction zone.

ROBERT PYZEL.
CLARENCE G. GERHOLD.